April 23, 1946.   F. R. MILLER   2,398,799
LIGHT SCREEN
Filed July 19, 1940   2 Sheets-Sheet 1
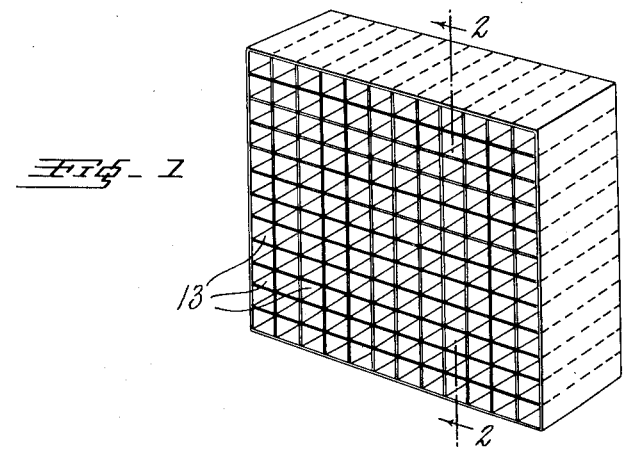
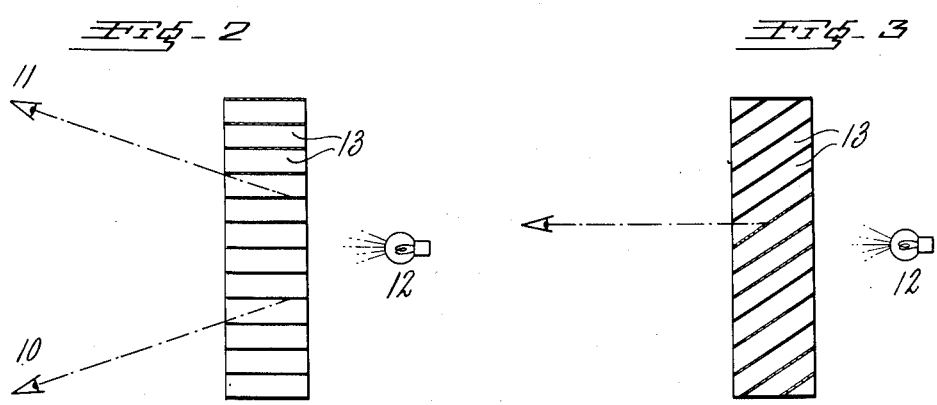
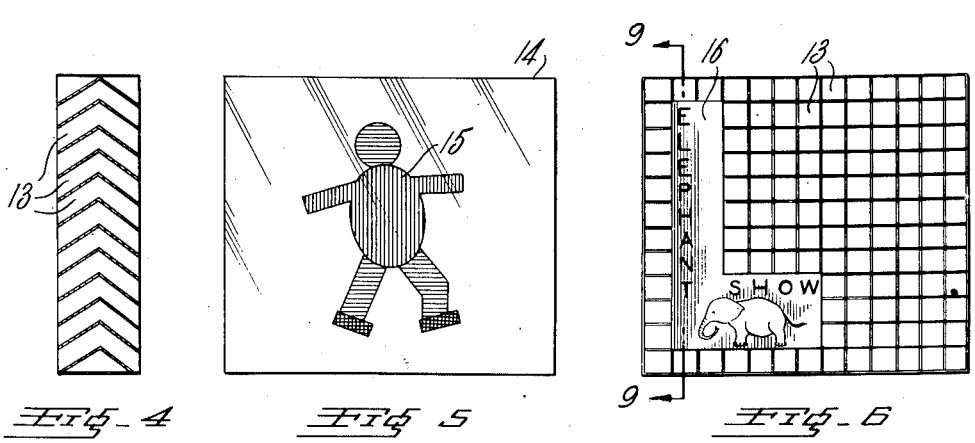
INVENTOR.
FREDERICK R. MILLER
BY Charles J. Holland,
ATTORNEY April 23, 1946.    F. R. MILLER    2,398,799
LIGHT SCREEN
Filed July 19, 1940    2 Sheets-Sheet 2
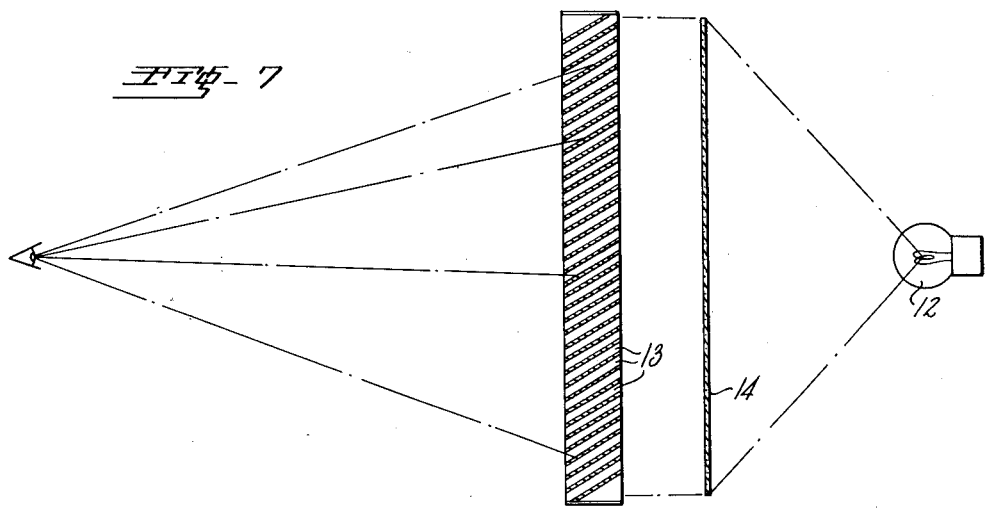
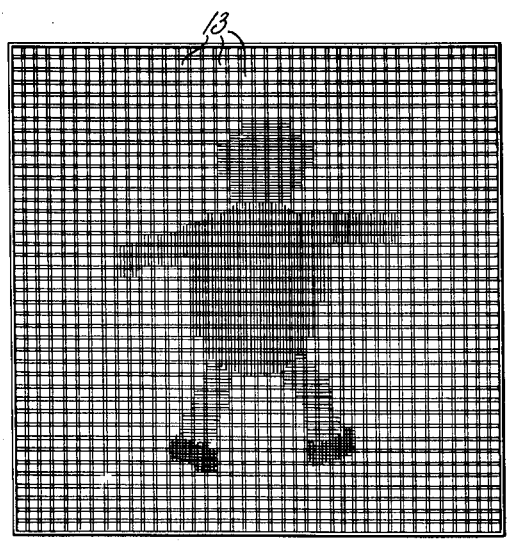
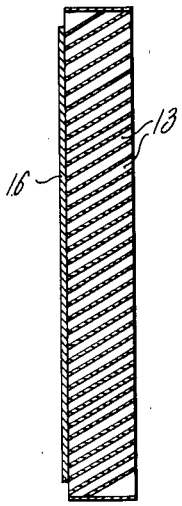
INVENTOR.
FREDERICK R. MILLER
BY
ATTORNEY Patented Apr. 23, 1946

2,398,799

UNITED STATES PATENT OFFICE 2,398,799

LIGHT SCREEN

Frederick R. Miller, Newark, N. J.

Application July 19, 1940, Serial No. 346,257

2 Claims. (Cl. 40—130)

This invention relates to a novel type of screen adaptable for use in receiving images projected thereon by means of illumination and to a method of reproducing pictures by instrumentalities including the screen.

Screens of various types have been used in the past to form a surface for receiving forms and pictures projected from behind the screen. Such screens have generally been of translucent material, such as ground or etched glass, muslin or the like. Also, reticulated or honeycombed structures have been used to make lighted objects behind them more visible in daylight, but these structures can not be correctly termed screens, for they do not receive images projected upon them. They are more appropriately described as shadow boxes and produce their effects by providing a darkened space through which the lighted objects behind them show up more strongly by contrast. Similar structures of the shadow box type have likewise been used to provide a dark background to render light colored objects placed on the front or top of them more visible by contrast.

The device of the present invention differs markedly from all such previous structures. In the first place the screen of the invention is in every sense of the word a true screen in that it receives and holds a projected form or image on its surface. Furthermore, the objects that are produced on the screen are not themselves visible to the observer for the reason that the screen is composed of channels or cells set at an angle to the line of vision of a person in front of the screen. Only the reproduction of the object on the front of the screen is seen.

The screen, in fact, does not function as a shadow box to provide a dark space but, on the contrary, fills with light from an unseen source behind it, so that every channel or cell is illuminated. However, if transparent colored objects be interposed between the light source and the back of the screen, the light passing through such transparent objects projects color into such of the channels or cells as it impinges upon. The shade and tone of the color can be deepened and intensified by placing the object to be projected in contact with the back of the screen, and lightened and made less intense as the object is spaced from the screen.

It is an object of the present invention to provide a device having a cellular or channeled screen adapted to receive and reproduce in light, shade and color objects or forms projected thereon from behind.

It is a further object to provide a device of the general type described that will reproduce objects or forms in motion behind the screen, the reproduction of the moving objects appearing on the face of the channeled screen remote from the observer while the objects so reproduced are concealed from the observer by the angularity of the channels.

The images or pictures may be produced by a system of lights so set up as to flood the screen on one side, and by interposing between the illuminated source and the screen forms or objects which intercept the light and thus produce a design or picture on the side of the screen opposite to the source of illumination. The objects whose images are to be produced on the screen may be animate or inanimate and may be opaque, translucent or transparent, in accordance with the effect which is desired. By means of colored objects that are translucent or transparent, excellent color effect may be produced on the screen.

Furthermore, when the objects are set in motion, mechanically or otherwise, the picture produced appears in continuous motion. It will be seen that, in this respect, the pictures differ from ordinary motion pictures. In motion pictures, ordinarily an illusion of continuous motion is produced, but this is due to the inability of the eye to separate each frame of the film which is being projected at the speed at which the film moves through the projection machine. The eye holds any given image for a certain slight interval after it has actually passed from sight and is replaced by a new one. Due to this lag, one image flows or merges into the next one and the illusion is produced.

In the pictures of the present invention, however, actual motion is reproduced, and what is seen upon the screen is not a series of projected images, static in themselves, but the actual motion which the images are undergoing at the time, although the images themselves are hidden from the eye and only the shadow or transformation of the picture of them is seen in very pleasing, soft and agreeable tone.

A screen may be composed of channels or cells, transverse of the screen, with either straight or angle channels. The screens may be single or in a series of two or more, side by side, capable of receiving images and transforming light. The waves of light of differing intensities generated from any source pass into a cell opening, strike the wall, reflect and scatter the light rays, thus mixing, clearing and refining the irregularities. Thus, streaks or blotches of color projected may appear within the cell as a space or spot in uniform light, shade or color, in one or more tones or planes.

A number of such units, spaces or spots, side by side in a group, with each spot or space surrounded by an outline and with light rays intercepted and modified by objects representing the design, form a refined picture on the screen, and with objects in front of the screen add to the design or picture by a method of composition.

The screen, whether used singly or in series, consists of a group of channels or cells extending transversely of the screen. The channels are open at either side of the screen and thus permit light to enter from either side. The light entering is deflected through the channels and produces an illumination of the opposite side. The channels forming the screen may all be of the same length and diameter. On the other hand, these channels may be of different lengths or of different diameters, and by such variation of the channels, variation of light effects may be attained. Again, the cells may be grouped so that certain areas of the screen may be made up of cells of the same diameter or of the same length, while other areas of the screen differ in diameter or length or both.

The channels, if straight, should be viewed obliquely in order that the light source should be masked and not directly seen by the eye. However, this same result is obtained if the channels are set obliquely in the screen, or, if the channels are formed in an angle so that one portion of the length of the channel is oblique to the remaining portion thereof. In this case desirable effects may be secured by placing two or more screens in series, one behind and parallel to the others, the screens having oblique channels, or some having straight channels and others having channels oblique thereto. The screens so placed may be in contact with each other, or they may be separated a certain distance so that there is sufficient space between them to permit shifting of the design in any direction or to pass material to be reproduced between the screens.

The invention will be more clearly understood from the drawings in which Fig. 1 represents in perspective a screen of the present invention of a type in which the channels are represented as being of the same length and diameter; Fig. 2 shows a cross-section thereof on the line 2—2 showing that the channel cells run horizontally through the screen; Fig. 3 represents a cross-section of a similar screen in which the channels are oblique to the front and rear surfaces, and Fig. 4 is a cross-section of a similar screen in which each channel describes an angle within the screen; Fig. 5 is a transparent support having thereon a figure which may be either fixed or movable and is adapted to be interposed between the source of illumination and the rear of the screen; Fig. 6 is a front view of a screen such as is shown in Fig. 1 but having an insert thereon.

Fig. 7 shows the screen 13 of Fig. 3 with the transparent support 14 of Fig. 5 in operable position between the light 12 and the screen; Fig. 8 represents a front view of the screen of Fig. 7 showing the reproduction on the face of the screen of the image as shown in the support of Fig. 5; and Fig. 9 is a cross-section of Fig. 6 on the lines 9—9.

It will be observed that the channels of the screen in operation are placed at an angle oblique to the direct line of vision so that the observer in front of the screen is unable to see the source of illumination behind it. As shown in Fig. 2, the screen with horizontal channels running through it is intended to be placed, for example, at a distance above or below the line of vision of the observer. Such a screen might, for instance, be placed at a high point of a building above a busy thoroughfare, in which case the observer's position would be indicated by the eye 10; or it might be placed at a position below the observer whose position will be indicated by the eye 11. In either case it will be obvious that the observer could not directly see the source of illumination 12, the light from which passes through the channels 13 and shows on the front of the screen. Thus, a support such as shown at 14 in Fig. 5, having a figure 15 attached thereto, may be interposed between the source of illumination 12 of Fig. 2 and the back of the screen. If the figure 15 is composed of transparent colored material, the light passing through the figure and through the channels 13 of the screen appears in softened and refined presentation on the front of said screen. Such a figure may be so devised as to be moved either as a whole or by manipulation of the limbs thereof, and in such case a moving picture may be produced on the front of the screen. Of course, other types of figures may be used instead of the support indicated in Fig. 5, and even living objects may perform between the source of illumination and the back of the screen and the performance is reproduced on the front of the screen, or the support itself with its figures attached may be caused to move between the source of illumination and the back of the screen.

It will be obvious also from Fig. 3, in which the channels 13 are set obliquely to the surfaces of the screen, that this type of screen may be placed at a position on the same level with the observer, and because of the obliqueness of the channels 13, the source of illumination 12 will not be seen by the observer. This will be true also in the case of a screen in which the channels 13 are angular as shown in Fig. 4.

Fig. 6 shows a possible adaptation of a screen in which an insert 16 is indicated as being placed on the front thereof. This insert may be opaque in nature and have reading or other matter placed thereon, in which case a light from the front may be employed as well as a source of illumination at the rear to show representations through the unobstructed cells. On the other hand, the insert may be transparent or translucent, in which case any matter contained thereon is fully displayed by light from behind.

Various effects may be obtained by varying the cross-sectional area of the cells. Thus, as shown in Figs. 7 and 8, a figure such as 15 of Fig. 5, when interposed between the source of illumination and the back of a screen having cells very large in cross-sectional area, would appear on the front in refined block formation. It will be observed from Fig. 8 that the reproduction of the image reproduces the same coloring as that shown in the image of Fig. 5, the colors being indicated in the drawings by means of appropriate conventional lines. On the other hand, if the screen is composed of cells having very small cross-sectional area, the presentation of the figure on the front of the screen would be very much softer in outline and detail.

Fig. 9, which is a cross-sectional elevation of Fig. 6 on the section line 9—9, shows the insert 16 affixed to the front of the screen 13 as by welding, clamping or otherwise. The fastening of this insert may be accomplished in any known manner.

It is to be noted also that a number of such screens may be placed in series and in this case objects may be interposed between one screen and the next succeeding screen and behind the last in succession of the screens, and by this means a composition of various elements may be made, all the elements of which are projected by the source of illumination at the rear through to the front surface of the front screen. In this way modulations of light and shade and color of a pleasing nature may be produced.

In the production of certain kinds of effects, insertions may be attached to the screen, as in Fig. 6, either permanently or removably, so as to permit interchanging of the design. Such effects are desirable in advertising and similar displays. An insertion of this kind may cover a large part of the screen, or it may cover a single cell. They may, for instance, be transparencies with letters, markings, symbols or designs thereon. If such a transparency is placed in front of the screen, the illumination from the screen shows up the design directly. The transparency may, however, be placed in back of the screen, in which case the transparency itself is not seen, but the shade or color of the design modifies the light from the light source passing through the channels, and the design is reproduced on the front of the screen. The insertions with or without drawings or characters may be placed on or within the channel cells on one or both sides of the screen, and a number of screens having such insertions may be placed in series, one behind the other, and when the light is thrown on the screen nearest the light source, the light and color, message or design from the insertions is carried through to the front screen.

From the foregoing it will be evident that the picture or design formed on the screen is effected by the interposition of elements making up the picture or design between the light source and the back of the screen. If these elements are transparent and colored, the light passing through enters the cells of the screen from the back and is carried through the channels, where it is delivered in softened and modified form at the front of the screen channels, the pattern or picture being there observable.

By this means, pictures may be reproduced by interposing a succession of inanimate pictures between the light source and the back of the screen in such rapid succession that on reproduction on the front of the screen an illusion of motion is effected as on an ordinary motion picture screen. It is also possible, by interposing living forms between the light source and the screen, to reproduce the action of these forms in a picture on the front of the screen in which the actual motion is accurately reproduced.

Many pleasing and striking effects can be obtained by interposing irregularly-shaped materials between the light source and the back of the screen. The effect thus produced results from the fact that such an irregular shape covers some channel areas completely and others only in part. As a result, in the channel areas that are completely covered, a deep shade is obtained, but where the channels are only partly covered, unobstructed light from the light source enters and modifies the shadow or color caused by the partial interposition of the shape. In this way, by reflection of the unobstructed light against the walls of the channel, the shade or color is lightened to the degree that such unobstructed light enters.

Similarly, the shades of the colors produced in the picture may be modified by other means. The objects between the light source and the back of the screen may be placed close to the screen or removed at a greater or less distance, thus permitting a greater or less amount of light rays to enter the channels. In this way any light, shade or color may be obtained. Again, such effects may be obtained by regulating the distance of the light source from the screen or by regulating the intensity of the light or the densities of the interposed objects. Furthermore, the appearance of the picture changes when light, white or colored, is projected obliquely to the screen so that the rays strike only the ends of the channels.

By making the channels irregular in shape, as by crinkling the walls thereof, or making them worm-shaped, light and shadow effects are produced so that the light or color within the cells will appear to be in more than one plane. In this respect, it is to be noted that in a screen, such as is illustrated in the drawings, the light or color within each cell will appear to be in a single plane.

The walls of the channels may be of various materials and by using materials therein that range from opacity to translucency, a wide variety of effects may be obtained. Thus, if the walls are translucent or transparent, light will pass through them and mix with the unobstructed light passing through the channels themselves. The beams of light may thus be directed or distributed to produce effects of different intensities. The effect upon the eye depends to a certain extent upon the kind of material forming the walls of the channels.

As indicated above, the channel screen may be made of any material such as glass, metal, or other materials that may be suitable to the requirements of any particular purpose or use. In fact, the screen may be composed of a sheet or plate of glass or transparent plastic material with the channel structure embedded or moulded therein.

Various uses will suggest themselves to a person skilled in the art and the invention contemplates the use of key forms and supports to produce the desired effects.

A key form is a transparent design sheet or a facsimile of the screen showing channel spaces in outline, or may be a photograph thereof on transparent material. The supports are sheets, preferably transparent, that hold or support the parts or elements that make up a design superimposed thereon. These supports are designed to be maintained stationary or to be shifted by any known means. Thus, a design may be printed on a transparency or a cut-out may be pasted thereon, and when the same is placed behind the screen between it and the light, the design formed will appear on the face of the screen.

It will be evident that by appropriate manipulation of the light, the objects to be projected, the inserts, key forms, etc., various compositions may be produced. These elements may be placed on one or both sides of the screen and may be either still or in motion, the sum of effects comprising a whole composition which may be viewed by the observer and even copied by hand or otherwise reproduced, as by photography.

Thus, in the textile industry a design may be formed upon a support, placed behind the screen, and a key form may be placed in front thereof.

The design may be photographed, for instance, through the key form superimposed on a screen so that it is possible to copy, record, or count the number of lines or threads within each given space.

Having thus described my invention, what I claim is:

1. The method of producing composition pictures, designs and the like which comprises the placing of a screen having channels therethrough adapted and arranged to afford passages for light through said screen, placing a source of illumination behind said screen in such position that said source is invisible through said channels, and interposing objects making up said composition both in front of and behind said screen whereby said composition is formed of the sum total of objects in front of said screen and the projected form of said objects behind said screen modified as to color and shape.

2. A screen for receiving projected pictures, designs and the like having channels transversely thereof running obliquely through said screen from front to back whereby light sources and objects behind said screen are concealed but illumination from said light sources and semblances of said objects in modified color and shape appear on the side of said screen remote from said light sources.

FREDERICK R. MILLER.